Figure 1:
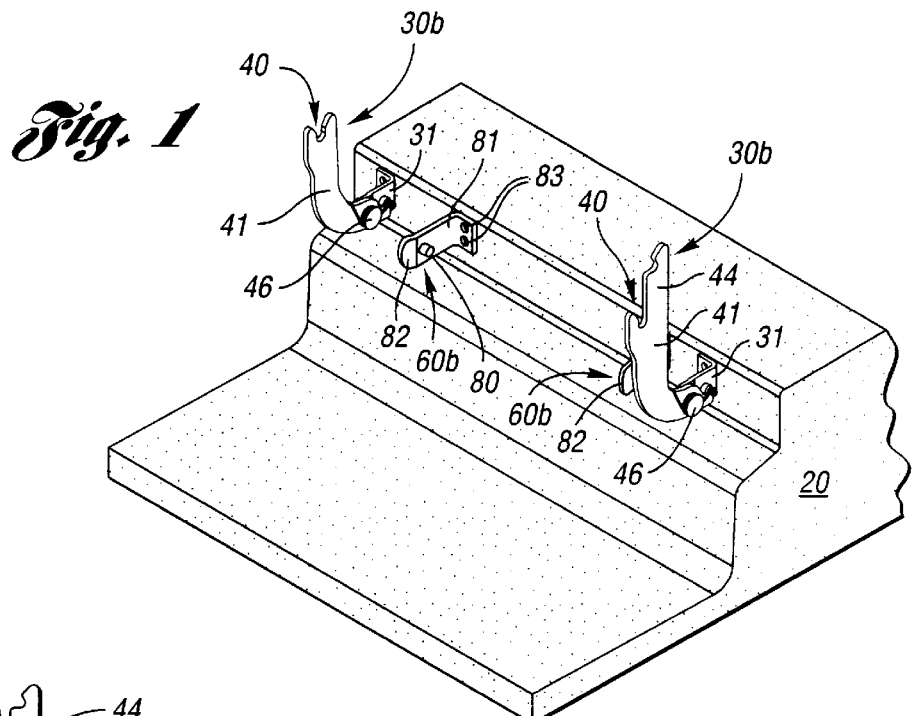

United States Patent [19]
Mack et al.

[11] Patent Number: 6,135,533
[45] Date of Patent: Oct. 24, 2000

[54] MOUNTING FOR A VEHICLE SEAT

[75] Inventors: John Mack; Andreas Neumann, both of Munich, Germany

[73] Assignee: Lear Corporation, Southfield, Mich.

[21] Appl. No.: 08/828,796

[22] Filed: Mar. 27, 1997

(Under 37 CFR 1.47)

[30] Foreign Application Priority Data

Mar. 27, 1996 [DE] Germany .............................. 196 12 200

[51] Int. Cl.[7] ...................................................... B60N 2/02
[52] U.S. Cl. .................................... 296/65.03; 296/65.05; 297/326
[58] Field of Search .................................. 296/63, 65.01, 296/65.03, 65.05; 297/326, 335, 336; 248/503.1

[56] References Cited

U.S. PATENT DOCUMENTS

| | | | |
|---|---|---|---|
| 4,759,580 | 7/1988 | Berkkich, Jr. et al. | 296/65.03 |
| 4,978,158 | 12/1990 | Kubo et al. | 296/65.03 |
| 5,393,116 | 2/1995 | Bolsworth et al. | 296/65.03 |
| 5,496,088 | 3/1996 | Stewart | 296/65.03 |
| 5,634,686 | 6/1997 | Okazaki | 297/336 |
| 5,722,727 | 3/1998 | Unckrich | 297/336 |
| 5,765,894 | 6/1998 | Okazaki et al. | 296/65.03 |
| 5,775,763 | 7/1998 | Glinter et al. | 296/65.03 |

FOREIGN PATENT DOCUMENTS

| | | |
|---|---|---|
| 4408686 | 3/1994 | Germany . |
| 19612200 | 3/1996 | Germany . |
| 54-131221 | 10/1979 | Japan ...................................... 297/331 |

*Primary Examiner*—Stephen T. Gordon
*Assistant Examiner*—Patricia Engle
*Attorney, Agent, or Firm*—Brooks & Kushman PC

[57] ABSTRACT

Provided is a mounting for a vehicle seat, especially a vehicle rear seat, which has first attachment parts (30*a*, 60*a*) attached to the underside of the seat (10), and second attachment parts (30*b*, 60*b*) which are to be attached to the vehicle body (20), in order to secure the seat (10) to the vehicle body (20). In this case the first attachment parts (30*a*, 60*a*) and the second attachment parts (30*b*, 60*b*) form at least one first releasable hinge connection (30) and a second releasable hinge connection (60) spared apart from the former in the longitudinal direction of the seat (10). The second releasable hinge connection (60) is capable of locking.

21 Claims, 11 Drawing Sheets

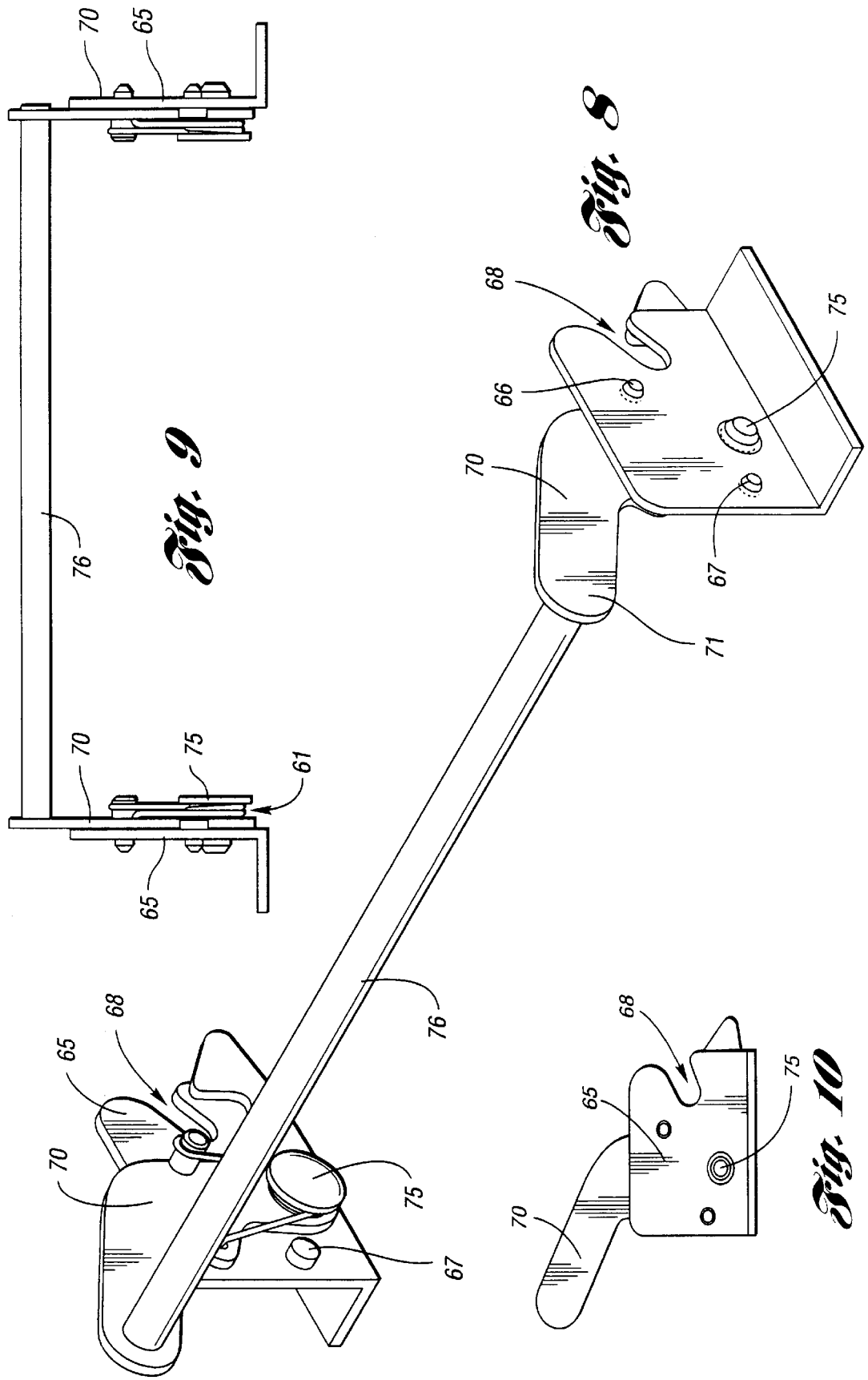

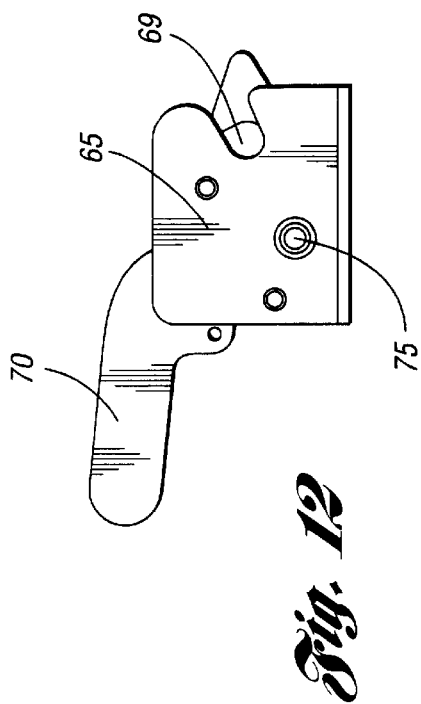
Fig. 12
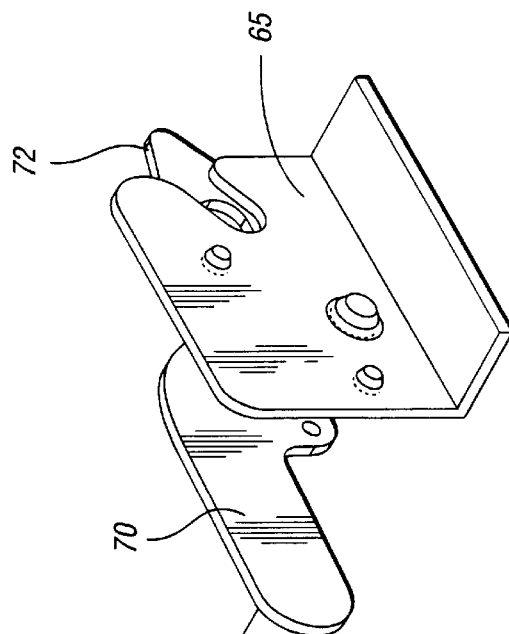
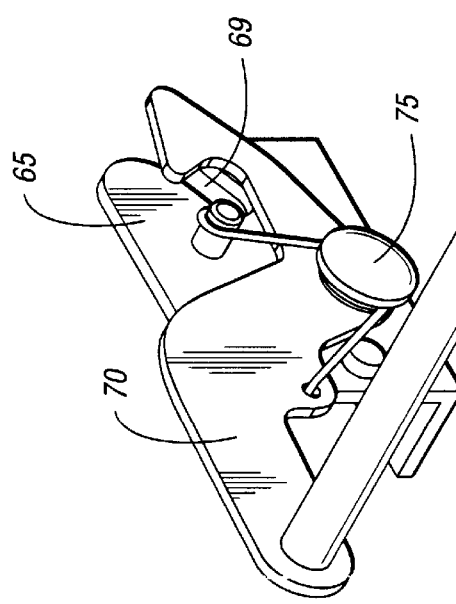
Fig. 11

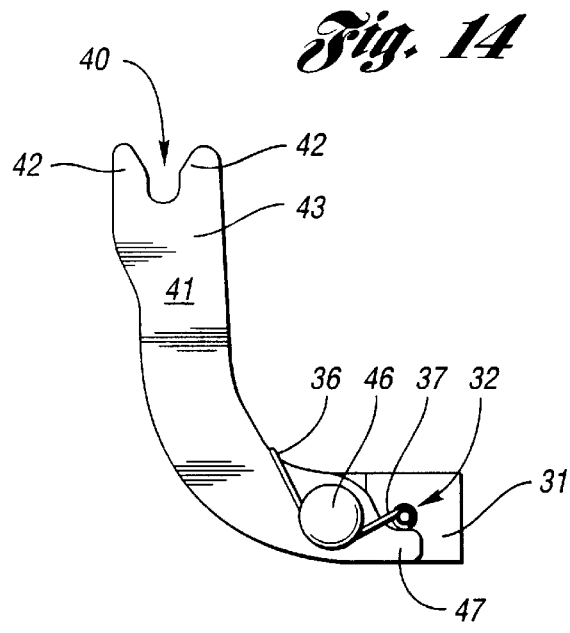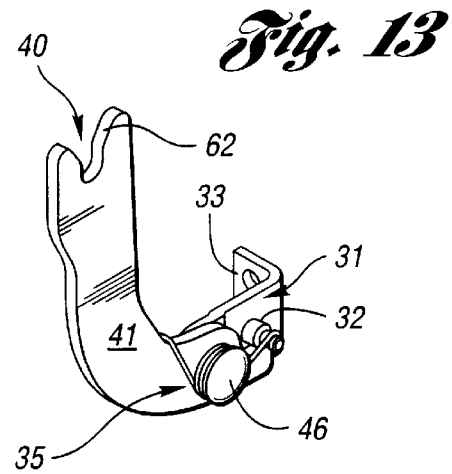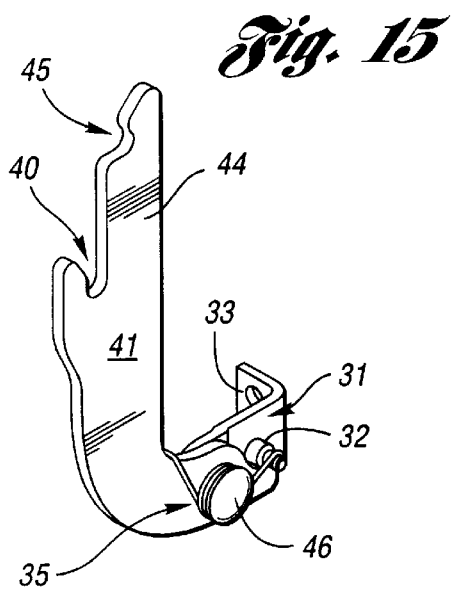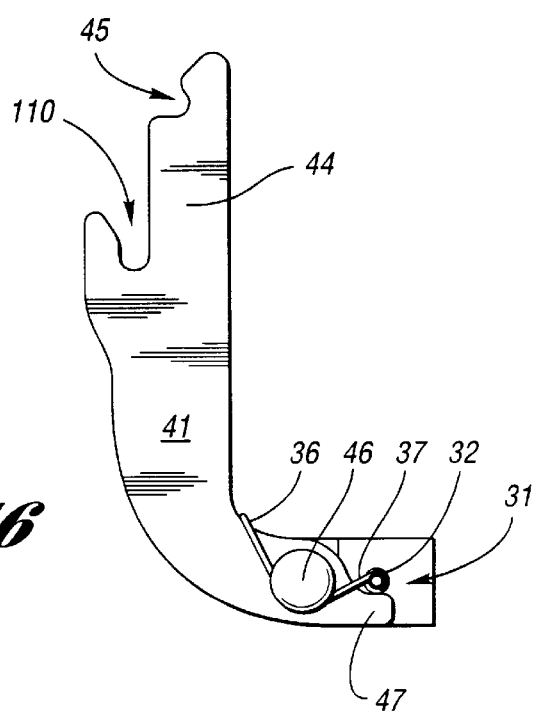

MOUNTING FOR A VEHICLE SEAT

The invention relates to a mounting for a vehicle seat, especially a vehicle rear seat, in which first attachment parts attached to the underside of the seat may be brought into engagement with second engagement parts on a vehicle body, in order to secure the seat to the vehicle body.

Vehicle seats with such mountings are known in the most varied constructive forms. In most cases the vehicle rear seats are securely mounted on the vehicle body, for example by means of brackets and studs which are attached to the vehicle body. Such vehicle rear seats are generally not intended to be removed by the user of the vehicle, so that dismantling such a vehicle rear seat is as a rule extremely difficult for the user.

A vehicle rear seat removable from the vehicle is known from the VW Beetle, in this case the vehicle battery being housed beneath the rear seat bench. In order to gain access to the vehicle battery the entire rear seat bench is designed to be removable and provided with clamp parts, in order to allow the rear seat bench to be securely clamped or engaged on the vehicle body.

In modern automobiles there is a requirement as necessary to enlarge the rear loading area of a vehicle if for example bulky articles are to be transported in a vehicle. In many cases in fact the backs of the rear seats are designed to tilt forward, yet in most cases the result is an inclined support surface due to the rear side of the tilted back rests when these are tilted forward on to the respective rear seat.

The object underlying the invention therefore is to provide a mounting for a vehicle seat, particularly a vehicle rear seat which enables the seat to be released in a simple manner and removed from the vehicle, and also to allow the seat to be simply remounted.

The solution according to the invention resides in designing a mounting for a vehicle seat of the type already mentioned in such a way that the first attachment parts and the second attachment parts form at least one first releasable hinge connection and a second releasable hinge connection spaced therefrom in the longitudinal direction of the seat, and that the second releasable hinge connection may be locked.

The object is achieved in a satisfactory way by means of the mounting according to the invention. When the second releasable connection is locked, then the seat is secured in the usual manner to the vehicle. However, when the second releasable hinge connection is unlocked, the seat may be removed from the vehicle.

In a further development of the mounting according to the invention, a pair of first and/or second hinge connections is provided, the hinge connections, relative to the longitudinal direction of the seat, being located symmetrically to one another. In this way a particularly stable construction of the mounting is achieved. Further, in that case a plurality of components may be identical in design.

In a special embodiment of the mounting according to the invention, the first hinge connection has a fork-shaped or trough-shaped receiving means, which rotatably accommodates an axle portion, one component of the location and axle portion being attachable to the seat and the other respectively to the vehicle body. Depending on other constructive requirements, it is thus possible to choose which components are mounted on the seat or on the vehicle body.

In a special embodiment of the mounting according to the invention, the first hinge connection has a receiving bracket, which is articulated about a substantially horizontal axis on the vehicle body, and which forms at its free end the fork-shaped or trough-shaped receiving means. In such a construction the axle portion can be inserted in a simple way from above into the respective receiving means.

In further development of this mounting, the receiving bracket is in the form of an arcuate or angled lever, and may be attached by a bolt in a rotary manner on a bearing block on the vehicle body. In this way the receiving bracket needs little space, as in the built-in condition of the seat, it can be folded down under the seat.

It is particularly advantageous if in the mounting according to the invention the receiving bracket is pre-stressed or biassed by a spring into a substantially perpendicular position of rest in which the receiving means faces upwards. The receiving bracket then automatically adopts in the position of rest a position, which facilitates insertion of the axle portion.

In a special embodiment of the mounting according to the invention it is provided that the spring is a wound leg spring which engages with one leg on the receiving bracket and with the other leg on the bearing block. The spring may for example be attached to the axis of rotation of the receiving bracket, and pre-stress the receiving bracket into the desired position.

In a further development of the mounting according to the invention, the rotational movement of the receiving bracket is restricted by a stop in such a way that the receiving bracket stands substantially vertically in the stopped position, i.e. in the position of rest. This measure also contributes to bringing the receiving bracket into a position favourable for mounting the seat.

In a further development of the mounting according to the invention, the receiving bracket has at its top end and elongation which, in the position of rest of the receiving bracket projects upwards close to the receiving means, and forms a catch hook for locking a vehicle component. Such a special form of the receiving bracket can serve for example to lock a forward-tilted backrest in this tilted position, this components then being capable of a latching engagement on the catch hook.

In a further development of the mounting according to the invention, the axle portion is in the form of a securing bracket which is U-shaped and, between the two legs of the U, has a bolt as an axis of rotation for engagement with the receiving means. Such securing brackets are easily manufactured, both legs of the securing bracket accommodating and guiding the receiving bracket between themselves.

In a special embodiment of the mounting according to the invention, the second hinge connection has two brackets with complementary bores, which are releasably interconnected by a lockable bolt as an axis of rotation. In this case the bolt can for example be secured by a split pin.

In another special embodiment of the mounting according to the invention, the second hinge connection has a bearing bolt and a lockable catch for engagement with the bearing bolt, one component each of bearing bolt and catch being attachable to the seat and the other component to the vehicle body. In this case the selection can be made depending on the constructive conditions in the vehicle.

However, attachment of the catch to the seat is preferred, as it is then possible to remove the seat itself with the hand which unlocks the catch. This considerably simplifies handling.

In a further development of the mounting according to the invention, the catch is rotatably mounted with a bolt on a bearing plate and is pivotable between an open position and a locked position. In this way unlocking and locking of the catch may be effected extremely simply.

It is particularly advantageous if in the mounting according to the invention the catch is rotatably mounted and is pre-stressed into its locked position by means of a spring. Actuation of the catch is then only necessary in order to unlock and remove the seat.

In a further development of the mounting according to the invention, the bearing plate has a U-shaped opening in its end face for receiving the bearing bolt and stops, which restrict the rotational movement of the catch on the bearing plate into the open position or into the locked position, respectively. Thus the bearing plate has a double function, serving on the one hand as a bearing for the catch and on the other hand to receive the bearing bolt.

It is particularly advantageous if in the mounting according to the invention the spring is a wound leg spring, which engages with one leg on the catch and with the other leg on the bearing plate. In particular, such a wound leg spring can be attached to the bolt with which the catch is rotatably mounted.

In a further development of the mounting according to the invention, the catch has on its end facing the bearing bolt a locking hook, which has on its front side an inclined ramp as a sliding surface for the bearing bolt, wherein the ramp merges via a projection into a recess on the rear side, which forms a counter-hook for the bearing bolt. In this way, during mounting of the seat, the rotatable catch can easily yield to the bearing bolt, which slides over the ramp. Once the bearing bolt has overcome the projection, the catch automatically reverts into its locked position and securely holds the bearing bolt by means of its counter-hook.

In a further development of the mounting according to the invention, the recess in the catch and the U-shaped opening in the bearing block are aligned to one another and form between one another a receiving opening for the bearing bolt. In this way there is afforded a perfect rotational bearing for the bearing bolt, which sits with minimum play between the catch and the bearing plate.

It is particularly advantageous if the U-shaped opening in the bearing plate is designed to follow the arc of a circle, whose centre is the axis of rotation of the first hinge connection. Then if the seat is rotated about the first hinge connection, the bearing plate with its associated bearing bolt can very easily engage or disengage, without complicated handling being necessary.

In a further development of the mounting according to the invention, a pair of catches and a pair of complementary bearing bolts are provided, and the pair of catches are connected with a common actuating rod and are synchronously actuable. The actuating rod simultaneously forms a handle which is attached to the seat, so that the seat can be carried with one hand. The seat may also be inserted with one hand also again unlocked and removed in the same way.

In the mounting according to the invention it provides appropriate if the bearing bolt is formed on a bearing block which has a guide for the catch. Thus mounting of a seat on a vehicle body is simplified and at the same time stable lateral bearing of the seat is ensured.

It is particularly advantageous if in the mounting according to the invention, the axes of rotation of the two hinge connections extend substantially parallel to one another in a horizontal direction. In this way assembly and removal of the seat are facilitated.

In a further development of the mounting according to the invention, the attachment parts of the two hinge connections to be attached to the vehicle body are secured on a common base plate. In this way assembly of the mounting on the vehicle body is simplified, as the attachment parts may be previously adjusted by the manufacturer.

It is particularly advantageous in the mounting according to the invention if all the attachment parts of the mounting can be accommodated on the underside of the seat in an area lying opposite the back of the knee of the user. In this way no additional constructive space is required, but a space is utilised which is available in any case.

In a further development of the mounting according to the invention, the attachment parts of the first hinge connection form supply lines for seat heating. If then this first releasable hinge connection is released, the electrical supply for the seat is automatically interrupted.

Figure 2:
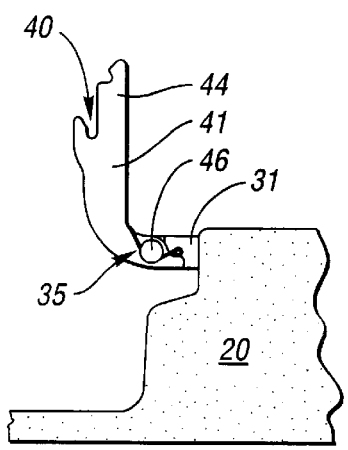
Figure 3:
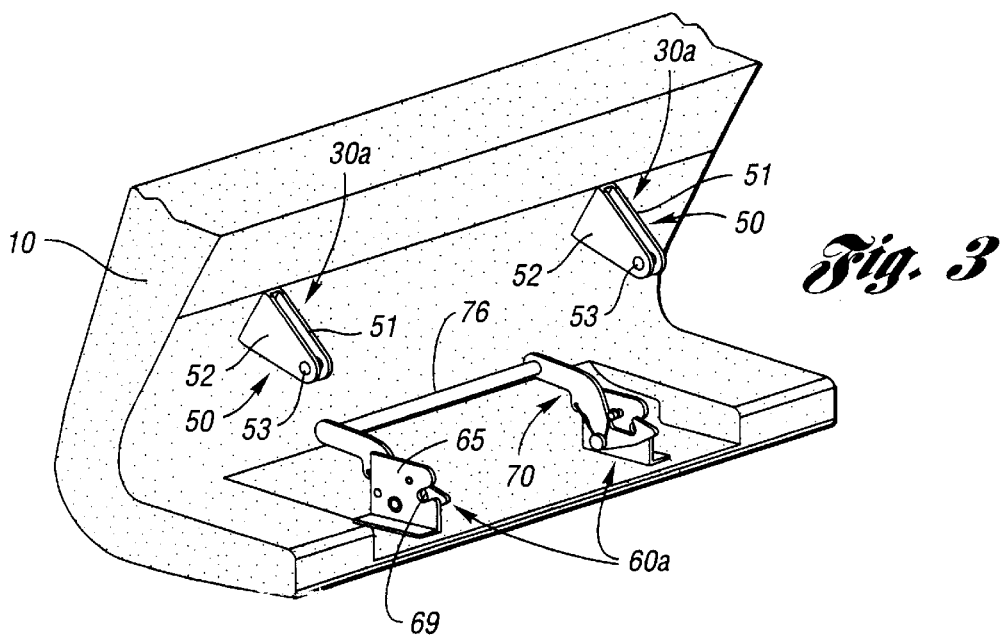
Figure 4:
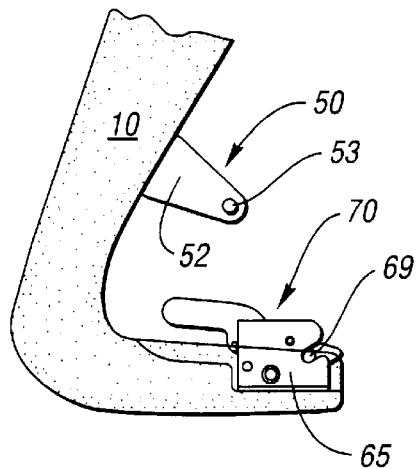
Figure 5:
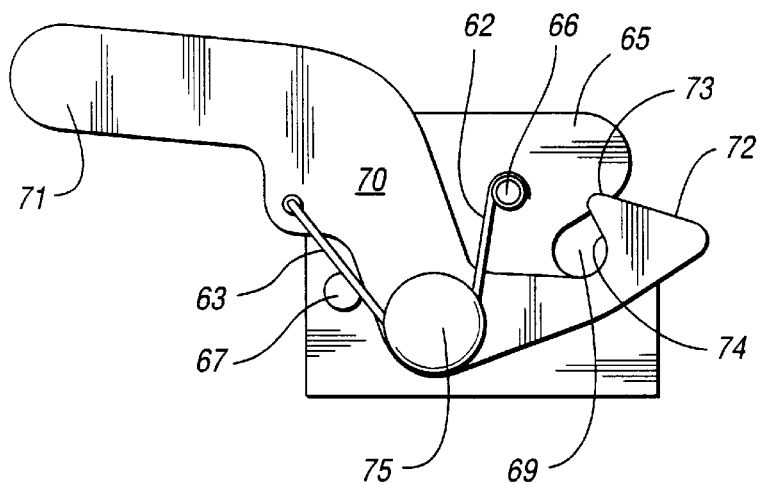
Figure 7:
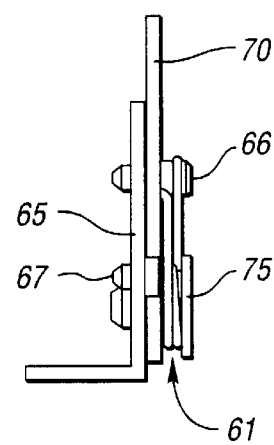
Figure 6:
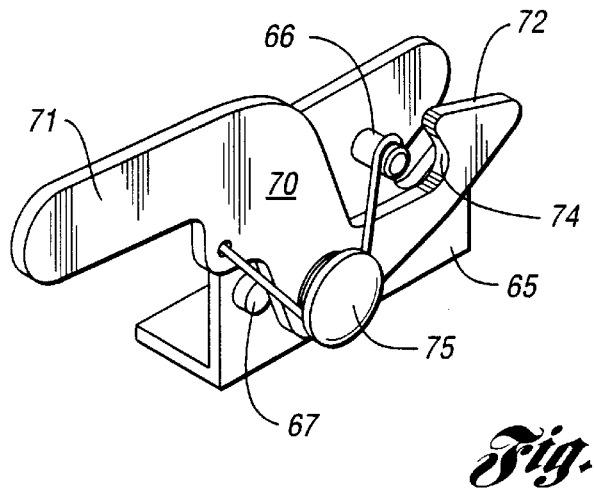
Figure 17:
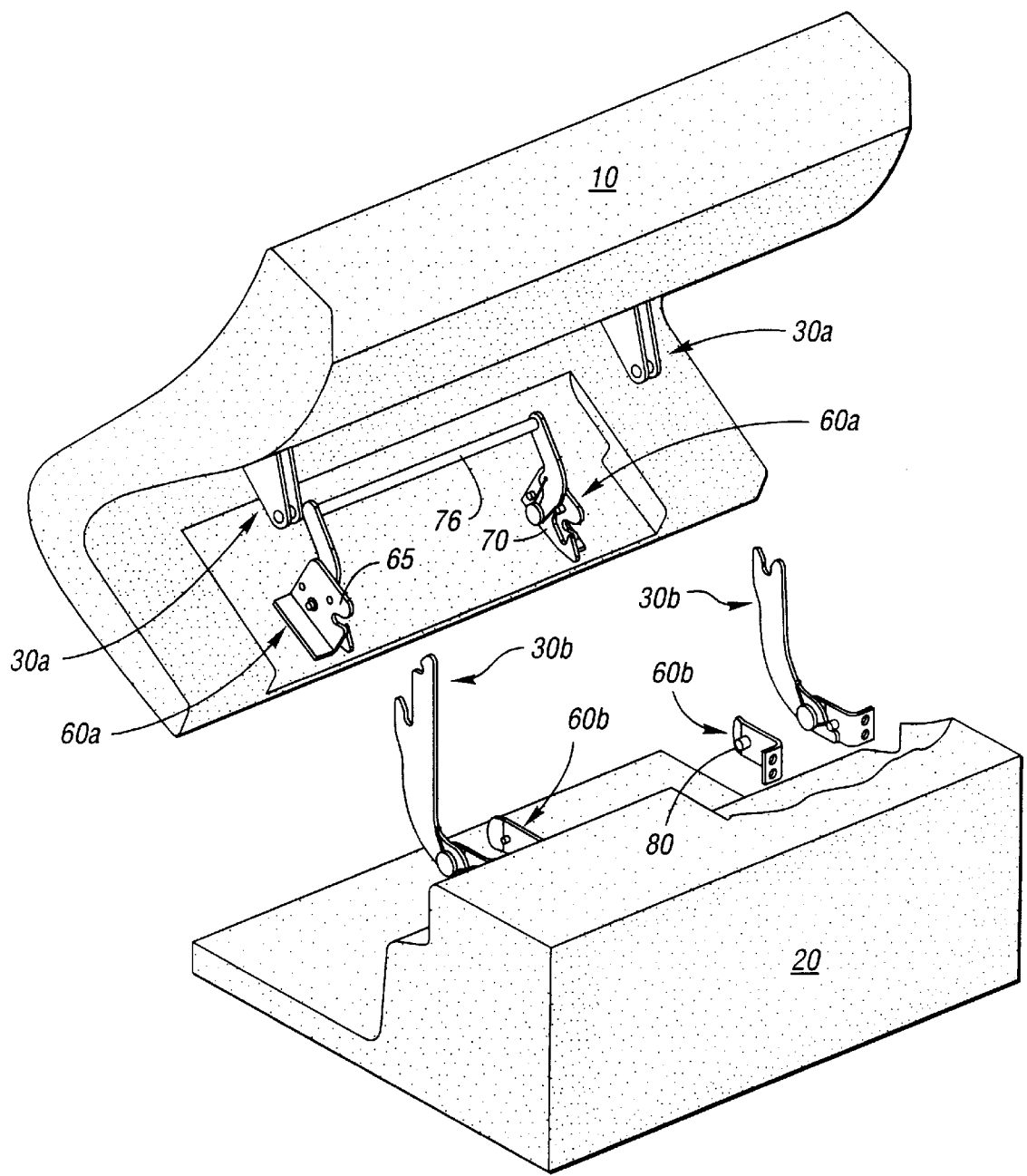
Figure 18:
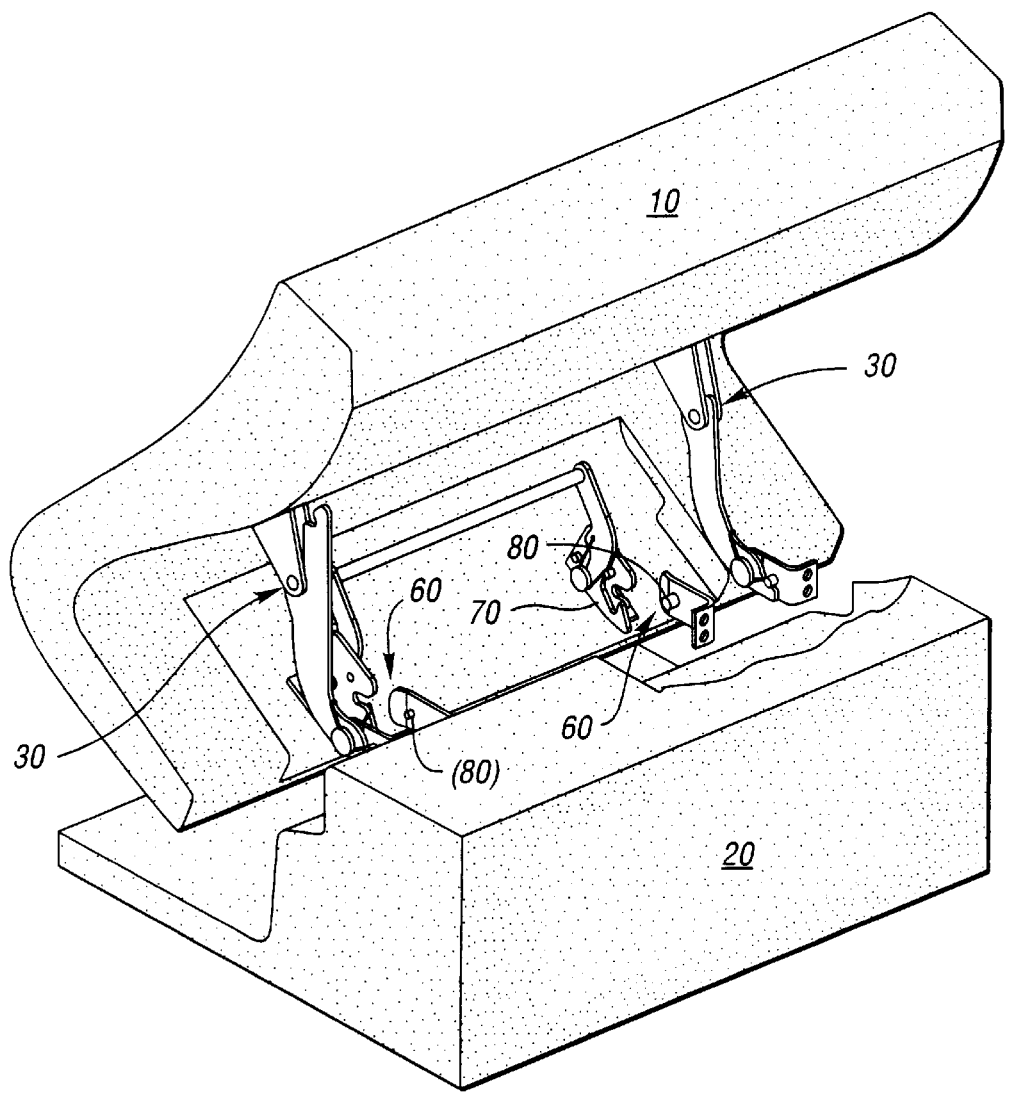
Figure 19:
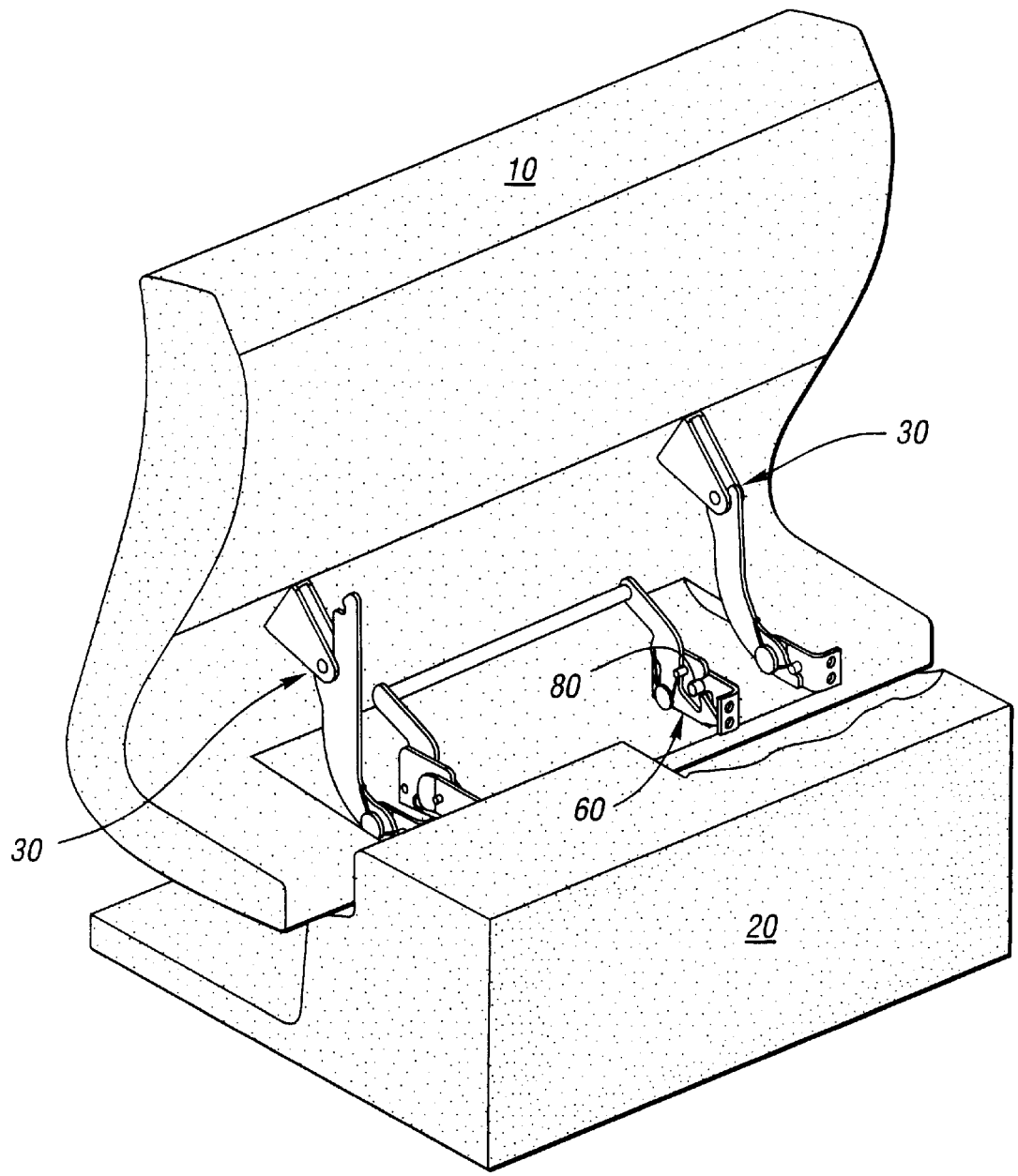
Figure 20:
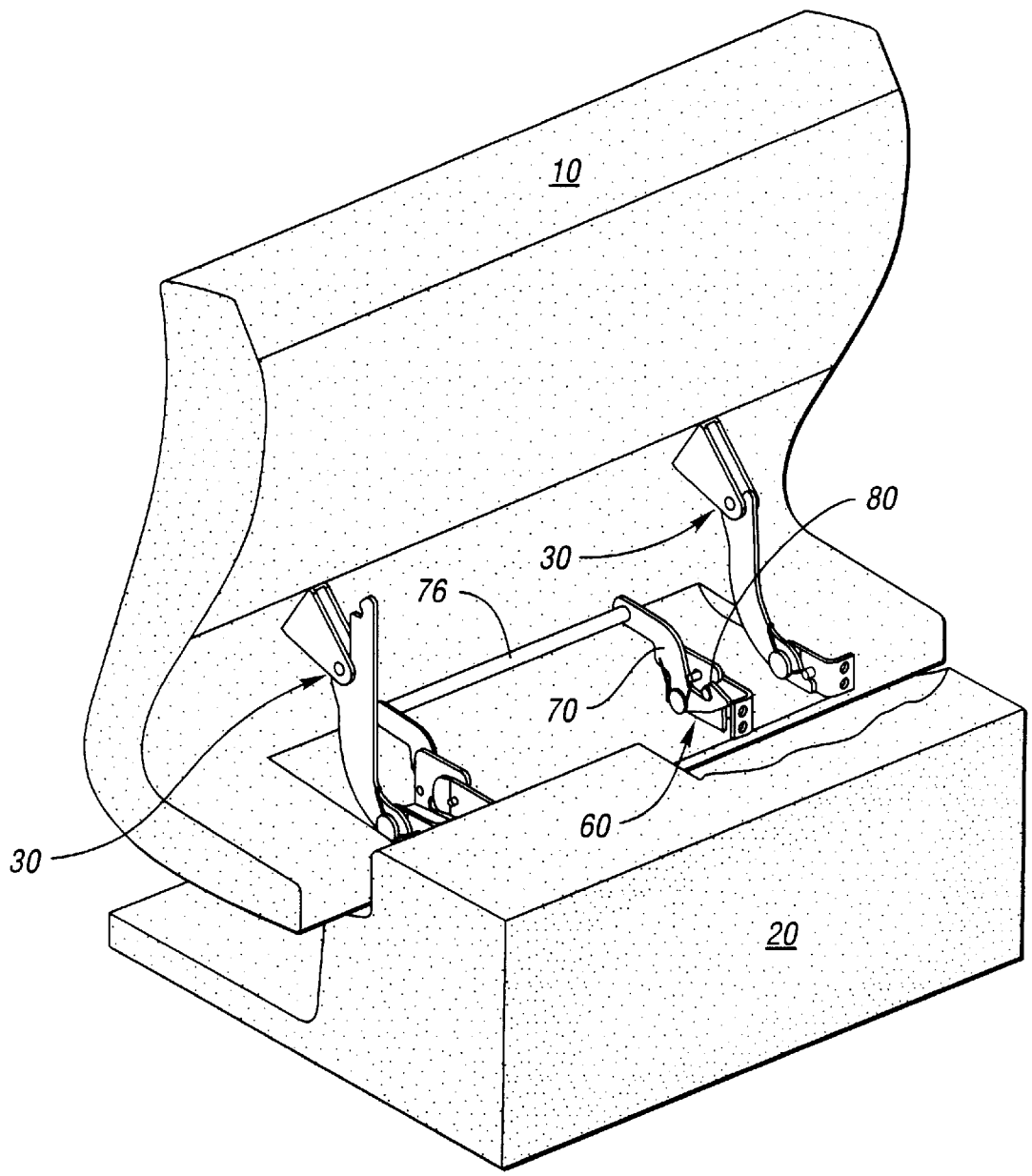
Figure 21:
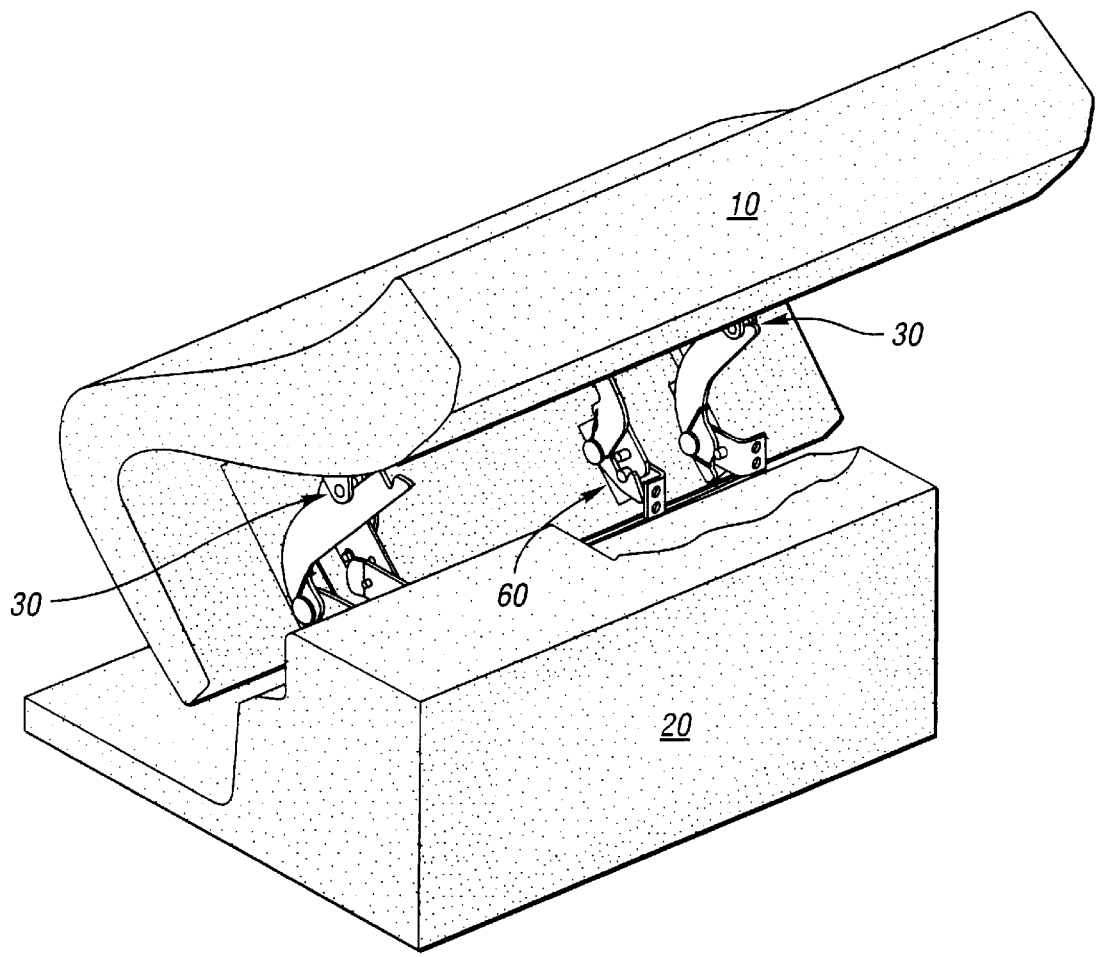
Figure 22:
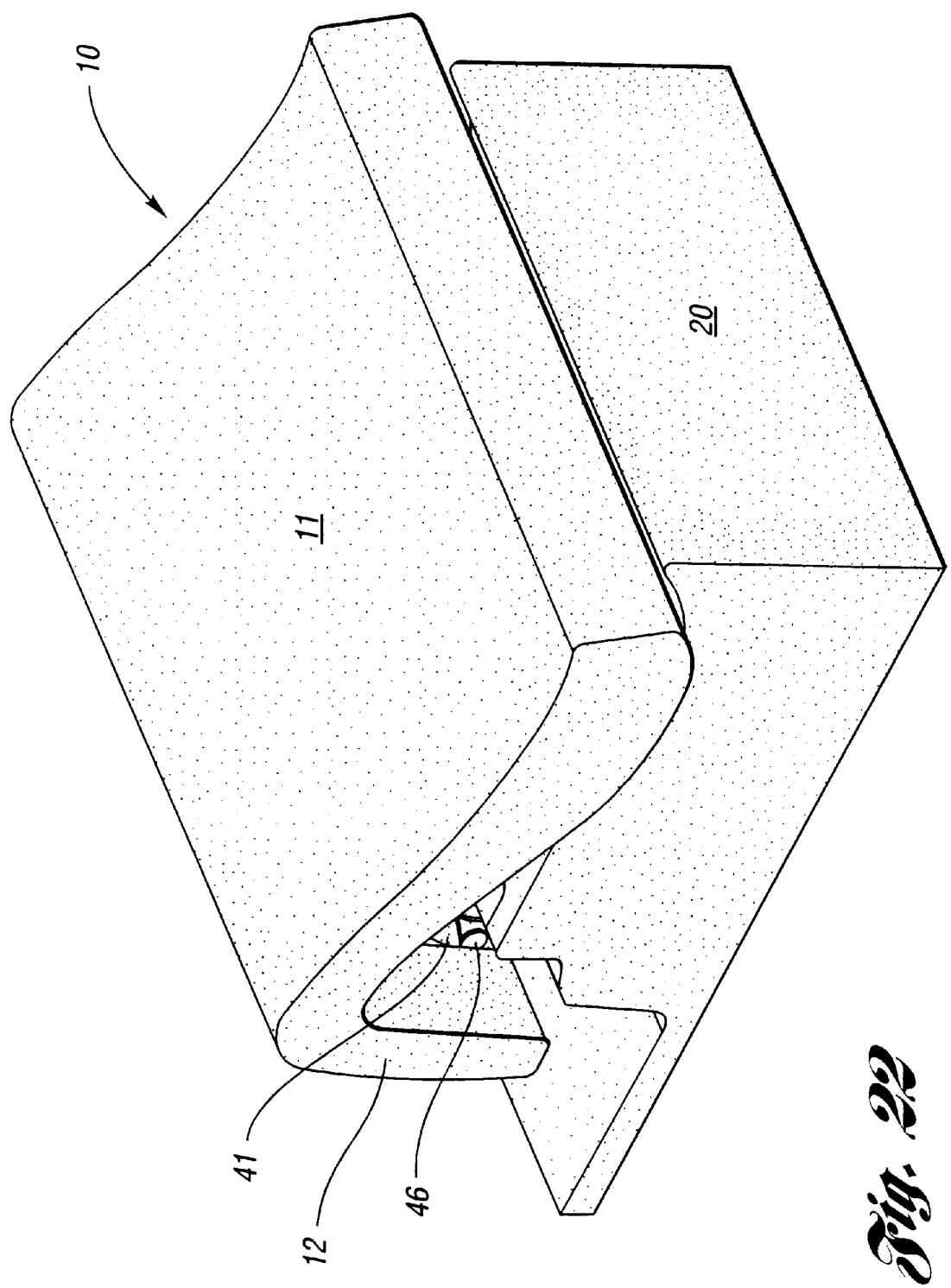

The invention will be explained in more detail in the following, also with regard to further features and advantages, with reference to the description of embodiments given by way of example and with reference to the accompanying drawings. The drawings show in:

FIG. 1 a perspective view of the attachment parts attached to the vehicle body of one embodiment of the mounting according to the invention;

FIG. 2 a side elevation of the arrangement according to FIG. 1;

FIG. 3 a perspective view of the attachment parts attached to the seat, of one embodiment of the mounting according to the invention;

FIG. 4 a side elevation of the arrangement according to FIG. 3;

FIG. 5 a side elevation of a catch mounted on a bearing plate, and in the locked position;

FIG. 6 a perspective view of the arrangement according to FIG. 5;

FIG. 7 a front elevation of the arrangement according to FIG. 5 from the left;

FIG. 8 a perspective view of a catch mechanism in the open position;

FIG. 9 a side elevation of a catch mechanism according to FIG. 8, from the left or behind, respectively;

FIG. 10 a side elevation of the catch mechanism according to FIG. 8, in the open position;

FIG. 11 a view of the catch mechanism in the locked position corresponding to FIG. 8;

FIG. 12 a side elevation corresponding to FIG. 10 of the catch mechanism in the locked position;

FIG. 13 a side elevation of a first embodiment of a receiving bracket mounted on a bearing block;

FIG. 14 a perspective view of the arrangement according to FIG. 13;

FIG. 15 a perspective view corresponding to FIG. 14 of a second embodiment of a receiving bracket, which is mounted on a bearing block;

FIG. 16 a side elevation, corresponding to FIG. 13, of the second embodiment of a receiving bracket, mounted on a bearing block;

FIG. 17 a perspective view of the attachment parts for the hinge connections before assembly of the seat on the vehicle body;

FIG. 18 a perspective view showing a first phase of assembly of the seat on the vehicle body, the first hinge connection being established;

FIG. 19 a perspective view explaining the second phase of assembly of the seat, the second hinge connection being established, but not yet locked;

FIG. 20 a perspective view similar to FIG. 19, showing the next phase of assembly, the second hinge connection being locked;

FIG. 21 a perspective view explaining assembly on the seat on the vehicle body, both hinges being in engagement with one another and the seat being tilted into its position of rest on the vehicle body, and FIG. 22 a perspective view showing the seat in its assembled position, the mounting being accommodated on the under side of the seat in the corner region between the seat surface and the front face of the seat.

The overall situation of the releasable mounting for a vehicle seat, especially a vehicle rear seat, is shown most clearly in FIG. 17. Visible are a seat 10, which has first attachment pars 30a and 60a and is provided for assembly on a vehicle body 20, which in turn comprises second attachment parts 30b and 60b.

The first attachment parts 30a and 60a which in the embodiment shown are provided on the seat, can be seen in further detail in FIGS. 3 to 12, while the second attachment parts 30b and 60b, which are provided in the embodiment shown on the vehicle body, are shown in more detail in FIGS. 1 and 2 and in FIGS. 13 to 16.

Assembly of the seat 10 in the vehicle body 20 is then shown in FIGS. 17 to 22 which illustrate the individual phases of assembly, in which firstly the first hinge connections 30 and then the second hinge connections 60 are established. When removing the seat 10 from a vehicle, the phases according to phases 17 to 22 are followed in reverse sequence.

In the embodiment shown in FIG. 1, a pair of receiving brackets 41 is provided, which are respectively articulated by bolts 46 on a bearing block 31. The receiving bracket 41 has on its upper side a fork-shaped or trough-shaped receiving means 40, in order to accommodate a corresponding axle portion 50. Provided between the pair of receiving brackets 41 is a pair of bearing bolts 80, which are provided on bearing blocks 81, which are to be attached by screws or bolts not shown to the vehicle body 20. Corresponding bores 83 in the bearing block 81 an obliquely-extending guides 82 are shown schematically in FIG. 1.

FIGS. 13 to 16 show more details of the receiving brackets 41. It will be seen that the receiving brackets 41 are in the form of angular or arcuate levers, which are mounted with a bolt 46 as an axis of rotation on the bearing block 31. At its free end the receiving bracket 41 has a widened portion 43, which is formed with oblique guide surfaces 42, which merge into the trough-shaped receiving means 40. The receiving bracket 41 has at its articulated end a nose 47, which abuts against a stop 32 on the bearing block 31. In this position of rest the receiving bracket 41 stands substantially vertically in such a way that a complementary axle portion 50 may be easily inserted at its upper side into the receiving means 40.

By means of appropriate measures it can be ensured that this position of rest is a stable position which may only be disengaged by the application of external force. On the one hand this is achieved by the distribution of weight of the material of the receiving bracket 41 with respect to the axis of rotation formed by the bolt 46. On the other hand a spring 35 ensures that the receiving bracket 41 is pre-stressed into this position of rest. The spring 35 is appropriately in the form of a wound leg spring which, in the embodiment shown, is wound about the bolt 46 and engaged with one leg 36 on the receiving bracket 41, while its other leg 37 engages on the bearing block 31. In particular the stop 32 in any case provided on the bearing block 31 is suitable for this purpose.

The bearing block 31 may be mounted by appropriate attachment screws or the like on the vehicle body 20. For this purpose bores 33, shown schematically, are provided. FIGS. 15 and 16 show a special embodiment of the receiving bracket 41, an elongate portion 44 being provided at the free end of the receiving bracket 41, which extends next to the receiving means 40 in an upward direction and has a catch hook 45 at the outer end. Such a receiving bracket can serve for example to lock a back-rest of a vehicle. Naturally, other components in the vehicle may also be secured on the catch hook 45.

In FIGS. 13 to 16, the receiving bracket 41 is in the position of rest in which it stands substantially vertically, in order to accommodate the corresponding axle portion 50 on a seat 10. The receiving bracket 41 may be rotated about the bolt 46 as an axis of rotation in a clockwise direction, i.e. against the force of the spring 35. The receiving bracket can execute in this direction a rotation of about 90°, until the right-hand edge of the receiving bracket 41, in the presentation according to the FIGS. 13 to 16 comes into contact against the upper side of the stop 32. In this way these components may be conveniently stowed on the underside of the seat 10, once the seat is mounted.

The first attachment parts 30a and 60a are in the special embodiment attached to the seat 10, as can be seen from FIGS. 3 and 4. The first attachment parts 30a have axle portions 50, which in particular are in the form of securing brackets. These axle portions 50 have a U-shaped construction, a bolt 53 being incorporated as an axis of rotation between the two legs 51 and 52 of the U-shaped components, the bolt 53 being provided for engagement with the receiving means 40. Thus the two legs 51 and 52 accommodate the receiving bracket 41 between themselves, and guide it when the seat 10 is rotated about the axis of rotation of the second hinge connection 60 into its horizontal position.

The first attachment parts 60a on the seat 10 are shown in more detail in FIGS. 5 to 12. As FIG. 5 shows, a catch 70 with an angular form is provided, which is rotatably mounted with a bolt 75 on a bearing plate 65. In this case stops 66 and 67 on the bearing plate 65 restrict the rotary movement of the catch 70 about the bolt 75 as an axis of rotation.

The bearing plate 65 and the axle portions 50 are secured by conventional attachment parts not shown in further detail to the seat 10. The axle portions 50, in the form of securing brackets 50, can in this case be attached individually or by means of a common carrier to the seat 10. The bearing plate 65 may likewise be attached individually or by a common carrier on the seat 10.

As shown most clearly in FIGS. 8 and 10, the bearing plate 65 has on its end face a U-shaped opening, provided for accommodating the bearing bolt 80. In particular, the U-shaped opening 68 in the bearing plate 65 is designed along the arc of a circle, whose centre is the axis of rotation of the first hinge connection 30, i.e. the axis of rotation of the bolt 53. The reason for this will be explained later.

As shown most clearly in FIGS. 5 and 6, the rotatable catch 70 is angular in form and has on its end facing the bearing bolt 80 a locking hook, which has on its front side an obliquely-extending ramp 72 as a sliding surface of the bearing bolt 80. The ramp 72 then merges via a projection 73 into an arcuate recess 74 on the rear side of the projection, forming a counter-hook for the bearing bolt 80, when it is located on this rear side of the locking hook.

When the catch 70 with its ramp 72 comes into engagement with the bearing bolt 80, then the bearing bolt 80 slides along this ramp 72, the catch 70, in the view in FIG. 5, being pushed downwards clockwise and thus releasing access to the U-shaped opening 68 in the bearing plate 65. When the bearing bolt 80 has then passed the projection 73, the catch 70 rotates anti-clockwise, i.e. in the view in FIG. 5 upwards, with the result that the bearing bolt 80 is then caught in the bearing opening 69, which is formed by the recess 74 in the catch and the base of the U-shaped opening 68. This situation is shown particularly clearly in FIGS. 5 and 12.

The return movement of the catch 70 into its locked position is achieved on the one hand by the distribution of weight of the material of the catch 70 with respect to the bolt 75 as an axis of rotation. Furthermore the catch 70 is pre-stressed into the locked position by a spring 61. The spring 61 is appropriately a wound leg spring which engages with one leg 63 on the catch, while the other leg 62 engages on the bearing plate 65. The step 66 which is any case present is particularly suitable for this purpose. The spring 61 is more appropriately wound about the bolt 75 as an axis.

FIGS. 8 and 11 show a special embodiment of the catches, a pair of catches 70 in each case being securely connected to a common actuating rod, and thereby being capable of being actuated in common and synchronously. In this case the actuating rod 76 is secured to the rear end 71 of the catches 70. FIG. 11 shows the locked position of the catches 70, the actuating rod 76 adopting a lower position. If this actuating rod 76 is pulled upwards, the catches 70 rotate synchronously about the bolts 75, with the result that the U-shaped openings 68 in the bearing plates 65 are opened, in order to release the bearing bolts 80 located in the bearing opening 69. If the actuating rod 76 is released, it reverts into the locked position according to FIG. 11.

Although this is not shown in further detail, the attachment parts 30a and 30b which are provided on the vehicle body 20 or on the seat 10, respectively, can form an electrical supply for a seat heating system in the seat 10. Once the seat 10 is removed, the current supply is automatically interrupted.

The assembly of the seat 10 on the vehicle body 12 will be explained in more detail in the following with reference to FIGS. 17 to 22. The phases shown are then to be followed in reverse order for removal of the seat 10.

FIG. 17 shows the seat 10 with its first attachment parts 30a and 60a in a position directly before its assembly on a vehicle body 20. In this situation, the entire seat 10 may be held by the actuating rod 76.

As FIG. 18 shows, firstly the axle portions 50 are inserted into the corresponding receiving means 40, so that the first hinge connections 30 are established. In the next phase, the seat 10 need merely be rotated about the axis of rotation of the first hinge connection 30, so that the second hinge connection 60 is also established. FIG. 18 in this respect shows the catches 70 briefly before their engagement with the corresponding bearing bolts 80. For this purpose the bearing openings 69 are opened by raising the actuating rod 76.

Even if the actuating rod 76 is not raised, however, the second hinge connections 60 can be established simply by rotating the seat 10 about the axis of rotation of the first hinge connection 30. As explained above, the catch 70 yields by rotation about the axis of rotation of the bolt 75, so that the bearing bolt 80 can adopt its position in the bearing opening 69.

FIG. 19 shows the next phase in which the bearing opening 69 is already in engagement with the bearing bolt 80. In order to facilitate the understanding, the catch 70 however has not yet rotated back into its locked position.

FIG. 20 then shows the next phase in which both hinge connections 30 and 60 are established and in addition the catch 70 has adopted its locked position in which it securely holds the bearing bolt 80. In this way the seat 10 is securely attached to the vehicle body and locked in position. It can only be released and again removed if the locked position is removed by actuating the catches 70.

FIG. 21 shows the next phase in which the seat 10 is rotated into its horizontal bearing position. Thus the bearing bolts 80 act as axes as rotation for the seat which rotates with its bearing plate 65 and catch 70 about the bearing bolt 80. The receiving brackets 41 are thus rotated out of their vertical position into a horizontal position.

Finally, FIG. 22 shows the final phase, in which the seat 10 has adopted its bearing position. The seat surface 11 now faces upwards in the usual manner. The entire mounting is accommodated between the seat surface 11 and the end face 12 of the seat. This area is usually angular in shape and adapted to the back of the knee of a user.

In order to remove the seat, the phases according to FIGS. 17 to 22 are followed in reverse order. When the seat has been rotated into a vertical position according to FIG. 20, it is merely necessary to raise the actuating rod 76, so that the locking is released. If this actuating rod 76 is pulled further upwards, the entire seat is released due to the shaping of the attachment parts only form the attachment parts which are mounted on the vehicle body 20, so that it may be easily removed in order to provide the desired space in the vehicle.

When an embodiment is described above with reference to the drawings, in which in each case a pair of first hinge connections 30 and second hinge connections 60 are provided, which are arranged substantially symmetrically to a vertical central plane of the seat 10 in the longitudinal direction, this involves a particularly robust construction in which the forces acting on the seat 10 are uniformly absorbed. The invention is however not restricted to such an embodiment.

Thus it is possible in a first alternative, to use only one respective first releasable hinge connection 30 and one respective second releasable hinge connection 60 of the type described above. In this case, the bearing bolt 80 will more appropriate be located between a pair of bearing blocks 81 which then at the same time form lateral guides for the bearing plate 65 and the catch 70. The rear end 71 of the catch 70 then forms the actuating part for the catch 70 itself. If desired, a rod may project laterally at this rear end 71 of the catch 70, in order to simplify handling of the mounting for unlocking the catch 70.

If only one first hinge connection 30 and one second hinge connection 60 are provided, these will more appropriately be arranged approximately in the region of the central plane of the seat 10, in order on the one hand to simplify assembly and on the other hand to ensure uniform absorption of the forces acting on the seat. If desired, in that case projections (not shown) can be provided on the seat 10, which engage with complementary recesses on the vehicle body 20, in order exactly to position the seat 10 in its horizontal position. Alternatively, the recesses can be provided in the vehicle seat 10 and engage with projections on the vehicle body 20.

In a varied embodiment according to a second alternative, two first hinge connections 30, arranged symmetrically to one another, but only one second hinge connection 60, are provided. The first hinge connections 30 are then designed as described above in detail with reference to the drawings. The second hinge connections 60 can be designed as explained above with reference to the alternative. The second, lockable and releasable hinge connection 60 is then appropriately located in the region of the central plane of the seat 10, while the two first hinge connections 30 are provided symmetrically thereto. In this way a stable three-point bearing of the mounting is obtained.

In a further varied embodiment of a third alternative according to the invention, only one first hinge connection 30, but a pair of second releasable and lockable hinge connections 60 are provided. The second hinge connections 60 are then designed as described in detail with reference to the illustrations in the drawings, while the first hinge connection 30 is appropriately arranged in the area of the central plane of the seat 10 in the longitudinal direction, and is located between the two bearing blocks 81 with the bearing bolts 80. In this case also a stable three-point bearing of the mounting is achieved.

In order to assemble the attachment parts 30*a*, 30*b*, 60*a* and 60*b* care should be taken in all embodiments that, relative to the longitudinal extension of the seat 10 or of the vehicle body 20, the distance between the respective axis of the bearing bolt 80 and then receiving means 40 has the same value as the distance between the respective axis of the bolt 53 and the receiving opening 69 in the catch mechanism. Then assembly and dismantling of the seat 10 are possible in a simple way, without the occurrence of undesired clearance between the attachment parts.

What is claimed is:

1. Apparatus for mounting a vehicle seat to a vehicle body, in which at least two first attachment parts which are attached to an underside of the seat may be brought into respective engagement with at least two second attachment parts adapted to be mounted on the vehicle body, characterized in that one of the first attachment parts and one of the second attachment parts form a first releasable hinge connection and, spaced apart therefrom in a longitudinal direction of the seat, another of the first attachment parts and another of the second attachment parts form a second releasable hinge connection, and in that the second hinge connection has a bearing bolt and a lockable catch for engagement with the bearing bolt, one component each of bearing bolt and catch are attachable to the seat and the other to the vehicle body, and in that the bearing bolt is formed on a bearing block which has a guide for the catch.

2. The apparatus according to claim 1 wherein a pair of first hinge connections and a pair of second hinge connections are provided, the first hinge connections being arranged symmetrically to one another with respect to the longitudinal direction of the seat, the second hinge connections being spaced apart from the first hinge connections in the longitudinal direction of the seat, and further being arranged symmetrically to one another with respect to the longitudinal direction of the seat.

3. The apparatus according to claim 1 characterised in that the first hinge connection (30) has a fork-shaped or trough-shaped receiving means (40), which rotatably accommodates an axle portion (50), one component each of receiving means (40) and axis portion (50) being attachable to the seat (10) and the other to the vehicle body (20).

4. The apparatus according to claim 3, characterised in that the first hinge connection (30) has a receiving bracket (41) which is articulated to rotate about a substantially horizontal axis (46) on the vehicle body (20), and which forms at its free end (43) the fork-shaped or trough-shaped receiving means (40).

5. The apparatus according to claim 4, characterised in that the receiving bracket (41) is in the form of an arcuate or angled lever, and is attachable with a bolt (46) rotatably on a bearing block (31) on the vehicle body (20).

6. The apparatus according to claim 4 characterised in that the receiving bracket (41) is pre-stressed by a spring (35) into a substantially vertical position of rest, in which the receiving means (40) faces upwards.

7. The apparatus according to claim 6, characterised in that the spring (35) is a wound leg spring, which engages with one leg (36) on the receiving bracket (41), and with the other leg (37) on the bearing block (31).

8. The mounting according to claim 4 characterized in that the rotational movement of the receiving bracket is restricted by a stop in such a way that the receiving bracket stands substantially vertically in a stop position.

9. The mounting according to claim 4 characterized in that the receiving bracket has at its upper and an elongation which in a stop position of the receiving bracket projects upwards close to the receiving means and forms a catch hook for locking a vehicle component.

10. The mounting according to claim 3 characterized in that the axle portion is in the form of a securing bracket which is U-shaped and has a bolt as an axis of rotation for engagement with the receiving means.

11. The mounting according to claim 1 characterized in that the second hinge connection has at least one bracket with a complementary bore, which is releasably interconnected by a lockable belt as an axis of rotation.

12. The apparatus according to claim 1, characterised in that the catch (70) is rotatably mounted with a bolt (75) on a bearing plate (65) and is pivotable between an open position and locked position.

13. The apparatus according to claim 1, characterised in that the catch (70) is rotatably supported and pre-stressed into its locked position by means of a spring (61).

14. The apparatus according to claim 1 characterised in that the bearing plate (65) has a U-shaped opening (68) on its end face for receiving the bearing bolt (80) and stops (66, 67) which restrict the rotational movement of the catch (70) on the bearing plate (65) in the open position or into the locked position, respectively.

15. The apparatus according to claim 13 characterised in that the spring (61) is a wound leg spring, which engages with one leg (63) on the catch (70) and with the other leg (62) on the bearing plate (65).

16. The apparatus according to claim 1 characterised in that the catch (70) has on its end facing the bearing bolt (80) a catch hook, which has on its front side a ramp (72) as a sliding surface for the bearing bolt (80), the ramp (72) merging via a projection (73) into a recess (74) on the rear side, which forms a counter-hook for the bearing bolt (80).

17. The mounting according to claim 16, characterized in that the recess in the catch and a U-shaped opening in the bearing plate are aligned with one another and between themselves form a receiving opening for the bearing bolt.

18. The mounting according to claim 14, characterized in that the U-shaped opening in the bearing plate is formed along an arc of a circle whose center is an axis of rotation of the first hinge connection.

19. The apparatus according to claim 1 characterised in that a pair of catches (70) and a pair of complementary bolts (80) are provided, and in that the pair of catches (70) are connected with a common actuating rod (76) and may be actuated synchronously.

20. The apparatus according to claim 1 characterised in that the axes of rotation of the two hinge connections (30, 60) extend substantially parallel to one another in a horizontal direction.

21. Apparatus for mounting a vehicle seat to a vehicle body, in which two first attachment parts which are attached to an underside of the seat may be brought into respective engagement with two second attachment parts adapted to be mounted on the vehicle body, wherein one of the first attachment parts and one of the second attachment parts form a first releasable hinge connection, and spaced apart therefrom in a longitudinal direction of the seat, another of the first attachment parts and another of the second attachment parts form a second releasable hinge connection, the first hinge connection having a fork-shaped receiving means which rotatably accommodates an axle portion, one component each of the receiving means and axle portion being attachable to the seat and the other to the vehicle body, the first hinge connection having a receiving bracket which is articulated to rotate about a substantially horizontal axis on the vehicle body, and which forms at its free end the fork-shaped receiving means, the receiving bracket being in the form of an arcuate or angled lever, and being attachable with a bolt rotatably on a bearing block on the vehicle body.

* * * * *

UNITED STATES PATENT AND TRADEMARK OFFICE
CERTIFICATE OF CORRECTION

PATENT NO : 6,135,533
DATED : October 24, 2000
INVENTOR(S) : John Mack et al.

It is certified that error appears in the above-identified patent and that said Letters Patent are hereby corrected as shown below:

| | |
|---|---|
| Column 9, Line 50 (Claim 3), | delete "axis", and insert --axle-- therefor. |
| Column 10, Line 19 (Claim 11), | delete "belt", and insert --bolt-- therefor. |
| Column 10, Line 31 (Claim 14), | delete "in", and insert --into-- therefor. |
| Column 10, Line 43 (Claim 17), | delete "mounting", and insert --apparatus-- therefor. |
| Column 10, Line 47 (Claim 18), | delete "mounting", and insert --apparatus-- therefor. |
| Column 10, Line 66 (Claim 21), | delete "connection, and", and insert --connection and,-- therefor. |

Signed and Sealed this

Twenty-second Day of May, 2001

Attest:

NICHOLAS P. GODICI

Attesting Officer

Acting Director of the United States Patent and Trademark Office